United States Patent [19]

Fukuhara

[11] Patent Number: 4,653,316
[45] Date of Patent: Mar. 31, 1987

[54] APPARATUS MOUNTED ON VEHICLES FOR DETECTING ROAD SURFACE CONDITIONS

[75] Inventor: Toshihiko Fukuhara, Hadano, Japan

[73] Assignee: Kabushiki Kaisha Komatsu Seisakusho, Tokyo, Japan

[21] Appl. No.: 839,604

[22] Filed: Mar. 14, 1986

[51] Int. Cl.$^4$ ............................................. G01B 11/30
[52] U.S. Cl. ...................................... 73/146; 33/551; 356/369; 356/448; 364/550; 364/556
[58] Field of Search ................... 73/146, 105; 356/369, 356/448; 364/550, 556; 33/551

[56] References Cited

U.S. PATENT DOCUMENTS 4,571,695  2/1986  Elton et al. ............................ 33/551

FOREIGN PATENT DOCUMENTS 2311141  12/1976  France ................................. 73/146
25503  7/1978  Japan .

Primary Examiner—Donald O. Woodiel
Attorney, Agent, or Firm—Diller, Ramik & Wight

[57] ABSTRACT

A road surface is scanned with a laser beam in a direction transverse to the road surface to pick up the scanning locus of the laser beam on the road surface in a direction inclined to a beam scanning surface so as to obtain transverse profile data. The laser light reflected from the road surface is received in a direction inclined to the beam scanning surface for obtaining crack data. The distances to the road at three points in the longitudinal direction of a measuring car are measured. The running distance of the car is measured and the measured distance data are recorded in a recording device together with crack data, transverse profile data and longitudinal profile data.

11 Claims, 15 Drawing Figures

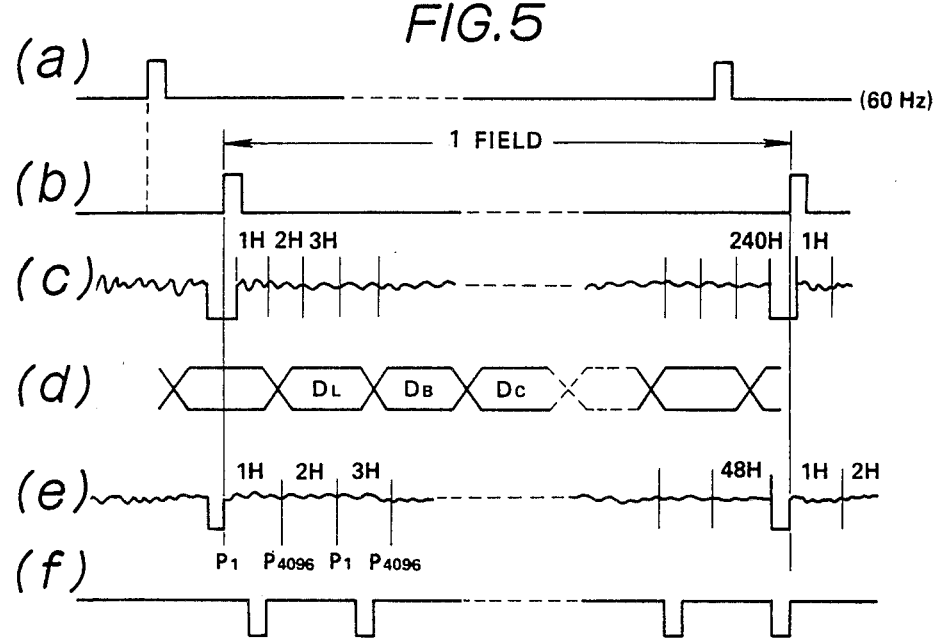
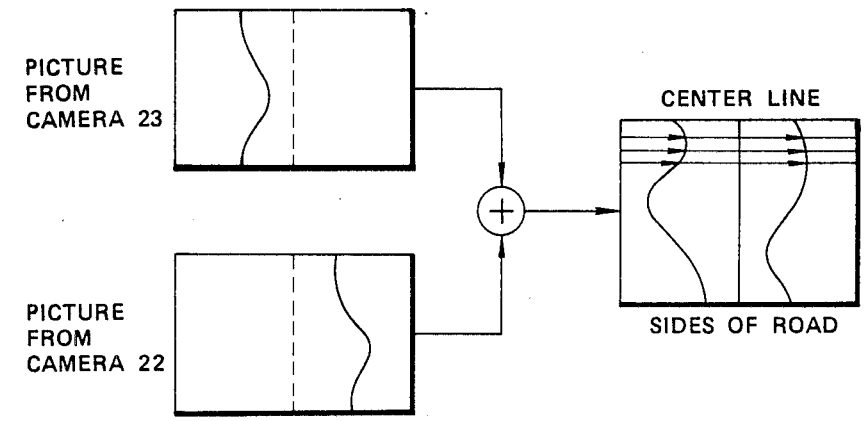
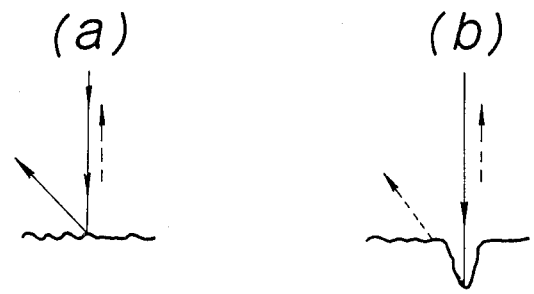

APPARATUS MOUNTED ON VEHICLES FOR DETECTING ROAD SURFACE CONDITIONS

BACKGROUND OF THE INVENTION

This invention relates to an apparatus mounted on a vehicle, motor car, for example, for detecting the road surface conditions.

As road surface conditions, there are the transversal profile and the longitudinal profile of the road surface and cracks thereof. In a prior art detecting system, independent detecting apparatus for detecting each road surface condition is mounted on respective cars so that elaborate labor and great expense are required for measuring the road surface conditions. Moreover, since individual apparatus not related with each other are used to measure respective conditions, not only the synchronism among respective measured data is impaired but also the analysis of the entire data cannot be made adequately and readily.

In this regard, Japanese Laid Open Patent Specification No. 10456/1978 discloses apparatus for measuring only the transverse profile of a road surface.

SUMMARY OF THE INVENTION

Accordingly, it is an object of this invention to provide a novel apparatus mounted on a vehicle capable of simultaneously obtaining data regarding the transverse profile and cracks of the road surface by commonly using a portion of the measuring apparatus.

According to this invention, there is provided vehicle mounted road surface condition detecting apparatus comprising laser beam scanning means for scanning a laser beam in a transverse direction of the road surface; image pick-up means for picking up a scanning locus of the laser beam in an inclined direction for producing transverse profile data of the road surface; light receiving means for receiving the laser beam reflected from the road surface in an inclined direction for producing crack data of the road surface; distance detecting means for measuring distances to the road surface from three positions on a line in the longitudinal direction of a measuring car for producing longitudinal profile data of the road surface; running distance detecting means for measuring a running distance of the measuring car; and recording means for recording data respectively produced by the image pick-up means, the light receiving means and the distance detecting means together with the running distance data produced by the running distance detecting means.

BRIEF DESCRIPTION OF THE DRAWINGS

In the accompanying drawings:

FIG. 5 is a timing chart useful to explain the measuring apparatus of this invention;

FIG. 8 is a diagram showing a processing of combining the picture images of two television cameras;

FIGS. 9a and 9b show the manner of reflecting a laser beam by a road surface;

DESCRIPTION OF THE PREFERRED EMBODIMENT

A preferred embodiment of this invention will now be described with reference to the accompanying drawings.

Figure 1:
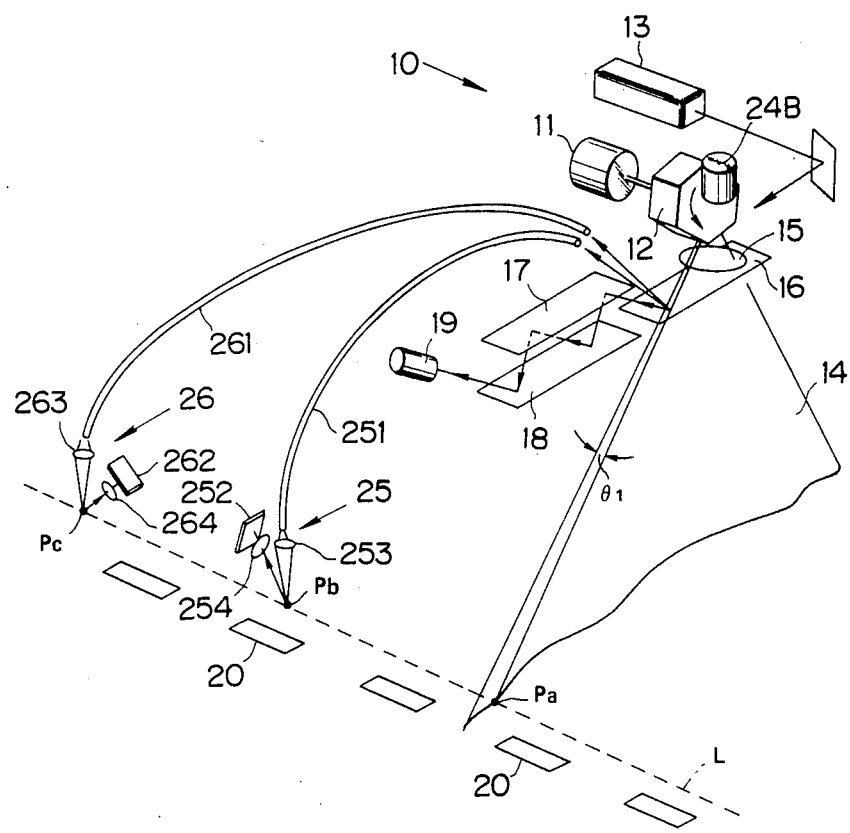
FIG. 1 is an exploded perspective view showing the optical system of a measuring apparatus embodying the invention.

FIG. 1 diagrammatically shows a laser beam scanning system 10 utilized in this invention in which when a laser beam is impinged upon a polygonal mirror 12 rotated by a synchronous motor 11 in a direction shown by an arrow from a laser beam projector 13, the laser beam would be scanned toward one side of the road from the center line 20 depicted on the road surface, that is in the transverse direction of the road.

In FIG. 1, the scanning surface of the laser beam is designated by reference numeral 14, the scanning surface extending at right angles with reference to the longitudinal axis of a measuring car to be described later. In this embodiment, it is assumed that the scanning speed of the laser beam is set to 2880 scan/sec.

Figure 2:
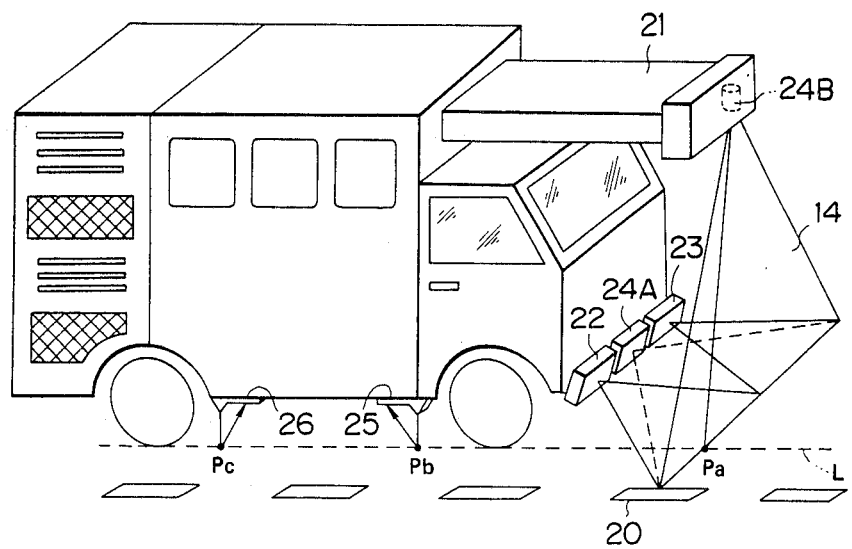
FIG. 2 is a perspective view showing a measuring car mounted with the measuring apparatus of this invention.

FIG. 2 shows a measuring car in which the laser beam scanning system 10 is housed in a casing 21 projecting above a drivers seat.

On both sides of the lower front portion of the car are mounted television cameras 22 and 23 each employing a CCD image sensor or the like. An optical sensor 24A in the form of a photomultiplier or the like is disposed between the television cameras. Immediately above a line L interconnecting the front and rear wheels, are disposed longitudinally spaced apart detectors 25 and 26 which detect distance to the road surface. An optical sensor 24B in the form of a photomultiplier, for example, is mounted on the front end of the casing to confront the road surface with its optical axis maintained substantially vertically.

The television cameras 22 and 23 and the optical sensor 24A are inclined by 60°, for example, with respect to the beam scanning surface 14 for catching the locus of the laser beam on the road surface and reflected light.

As shown in FIG. 1, the distance detector 25 is provided with an optical fiber cable 251 extending to the laser beam scanning system 10 and a position detector 252. The laser beam transmitted through the cable 251 is projected to the road surface at right angles thereto through a lens 253 and the light spot of the laser beam on the road surface is focused on the position sensor 252 via lens 254. The other distance detector 26 is constituted by elements 261–264 corresponding to the elements 251–254 described above.

Figure 3:
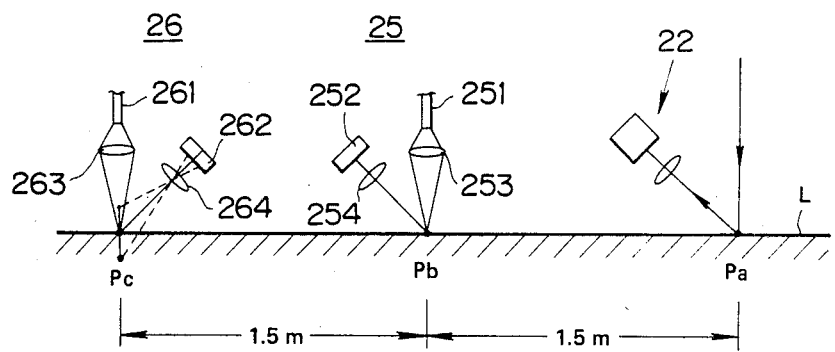
FIG. 3 is a diagrammatic representation showing the arrangement of means for detecting the distance to the road surface and a method of measuring the distance.

As shown in FIG. 3, the distance detector 25 is positioned such that the projected beam will be focused at a point Pb, 1.5 m to the rear side of a point Pa at which the laser beam scanning surface 14 intersects line L, while the distance detector 26 is positioned such that the projected laser beam will be focused at a point Pc, 1.5 m to the rear side of point Pb.

As shown in FIG. 1, a lens 15 and a partially transmissive mirror (half mirror) 16 are disposed beneath the polygonal mirror 12. The laser beam scanned by the polygonal mirror 12 reaches the road surface after passing through the lens 15 and the half mirror 16, while a portion of the laser beam is reflected by the upper surface of the half mirror 16.

In this embodiment, when the scanned laser beam is directed to the point Pa, the laser beam reflected by the half mirror 16 with a scanning angle $\theta$, is inputted to the base portions of the optical fibers 251 and 261. Each time the laser beam scanning angle becomes $\theta_1$, the distance detectors 25 and 26 project the laser beam upon the road surface.

On one side of the half mirror 16, there are provided two confronting mirrors 17 and 18 for passing therethrough the laser beam reflected by the half mirror 16 at the scanning starting point ($\theta$ scanning angle) and for transmitting the laser beam after a number of reflections, thus finally causing the laser beam to infringe upon the optical sensor 19. The optical sensor 19 detects the laser beam each time the laser beam reaches its scanning start position.

Although not shown, the car is provided with a running distance measuring wheel (fifth wheel) which is associated with a running distance measuring pulse generator (to be described later) for generating a pulse each time the car runs over a distance of 1 mm, for example.

The operation of this embodiment will be described with reference to the block diagram shown in FIG. 4.

At first, the measurement of the transverse profile of the road surface will be described. When a master clock pulse is inputted to a controller 31 from a high density video tape recorder (HD.VTR) 30, the controller 31 outputs a synchronizing signal of a frequency of 60 Hz as shown in FIG. 5a whereby a motor 11 of the laser beam scanning system 10 would be driven at a constant speed.

As the polygonal mirror 12 is driven by the motor 10, since the laser beam is scanned at a period of 1/2880 sec., the optical sensor 19 produces a rotational position signal having a frequency of 2.88 KHz. A synchronizing circuit 32 divides the frequency of the rotational position signal to a signal of 60 Hz as shown in FIG. 5b, which is applied to a synthesizing circuit 33 and to a signal processing signal to be described later as a synchronizing signal.

Figure 6:
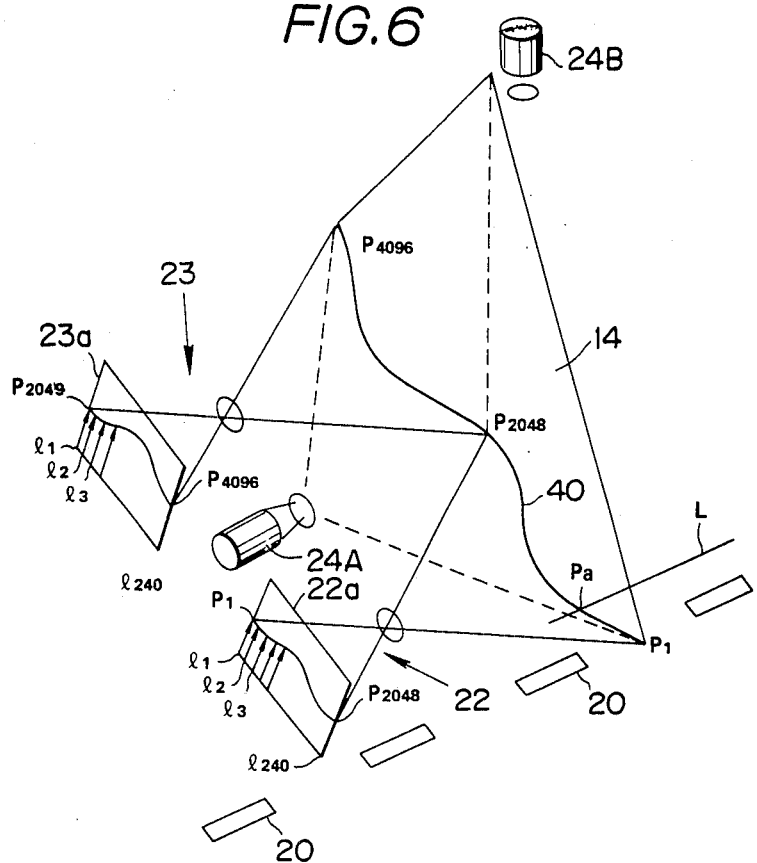
FIG. 6 is an exploded perspective view showing the manner of image pick-up with a television camera.

As shown in FIG. 6, when the scanning locus 40 of the laser beam is formed as a result of scanning the beam, the image pick-up surfaces of the television cameras 22 and 23 pick-up scanning loci respectively in the range of positions $p_1-P_{2048}$ and $P_{2049}-P_{4096}$.

Figure 7:
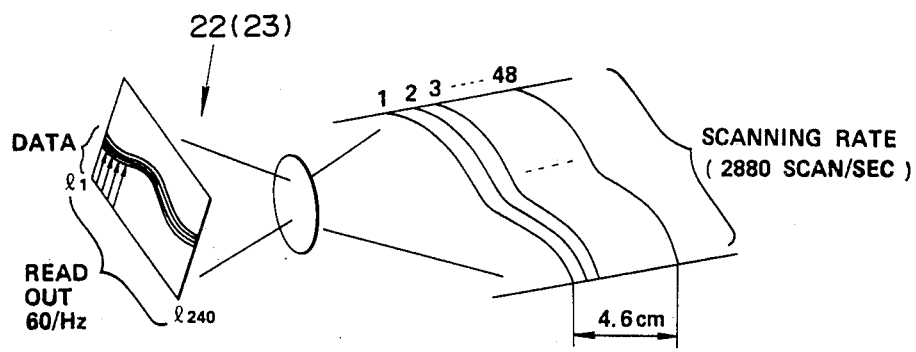
FIG. 7 is a perspective view showing in more detail the manner of image pick-up with the television camera.

Suppose now that the car is running at a speed of 10 km/hr, the running distance of the car for one second amounts to 4.6 cm as shown in FIG. 7. While the car runs over a distance of 4.6 cm, the laser beam is scanned 2880 times so that when it is assumed that the read out frequency of the cameras 22 and 23 is 60 Hz, the number of times of writing of the picture image to the cameras during the read out period becomes 48 with the result that closely adjacent 48 beam scanning loci would be written on the image pick-up surface of the television cameras. In this embodiment, since each television camera is provided with a CCD image sensor acting as an image pick-up element, at the time of reading out the picture image (to be described below) the center value of the 48 picture images would be read out.

In this embodiment, since the number of scanning lines of each television camera is 240, a total of 240 picture image data are read out by each camera in one field at a TV rate, as shown in FIG. 5c. As shown in FIG. 4, the data read out from respective television cameras are applied to the synthesizing circuit 33, where the data are synthesized in a manner to be described later and then recorded on a VTR 35. The image pick-up surface has a performance of temporarily storing and integrating so that picture image data written on the picture pick-up surface one frame before are read out. The reading out of the data is performed in synchronism with the output signal from the optical sensor 19.

The synthesizing circuit 33 synthesizes picture images read out from respective cameras 22 and 23 into a picture image representing the cross-sectional profile FIG. 8 shows the manner of the synthesis.

Thus, 60 transverse profiles are recorded in VTR 35 for one second as the car runs, while at the same time, the running distance of the car is also recorded. The signal generated by the pulse generator 50 at a rate of 1 pulse/mm is inputted to a pulse code modulation (PCM) circuit 37 via a correction circuit 36, and smoothing circuit 39 to be integrated and encoded. As a consequence, the PCM circuit 37 outputs a running distance data $D_1$ as shown in FIG. 5d, which is recorded in a voice track of the VTR 35. As a consequence transverse profiles obtained in respective fields and the running distances for respective profiles, that is the distances from the running starting position are sequentially recorded on the VTR 35.

The purpose of the correction circuit 36 is to correct the error in the running distance due to inclination or slip of the car by eliminating some of the inputted pulse.

The measurement of the cracks of the road surface will be described as follows

Figure 10:
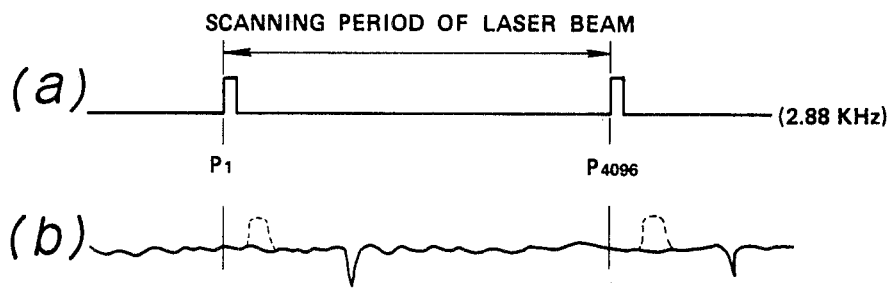
FIGS. 10a and 10b show waveforms of the output of an optical sensor where the road surface contains cracks.

As shown in FIG. 9a, where there is no crack in the road surface irradiated with the laser beam, a predetermined amount of diffused laser light will impinge upon the optical sensor 24A, but as shown FIG. 9b, where there is a crack 60, the amount of the laser light incident upon the optical sensor 24A decreases due to so-called shadow effect. Where a curve shown in FIG. 10a represents the rotational position signal outputted from the optical sensor 19 as shown in FIG. 10b, when the laser scanning beam passes through the crack, the output of the optical sensor 24A decreases. The position of a signal showing this output decrease represents the position of the crack in the transverse direction of the road surface. Where the center line 20 lies on the scanning locus of the laser beam, as the central line increases the amount of reflected light, a signal waveform as shown by dotted lines would appear.

Since the optical axis of the optical sensor 24B is directed to be perpendicular to the road surface in a case of either one of FIGS. 9a and 9b, no change would be resulted in the quantity of the incident light. Accordingly, in this embodiment, the outputs of both optical sensors 24A and 24B are applied to the signal processing circuit 34 to obtain a difference therebetween, and the difference signal is recorded on the HD.VTR 30. More particularly, the output of the optical sensor 24B is taken as a reference value and the deviation of the output of the optical sensor 24A from the reference value is recorded on the VTR 30 as a crack data. FIG. 5e illustrate crack data recorded on the VTR 30. Alternatively, the ratio between the outputs of the optical sensor 24A and 24B may be recorded on the VTR 30. The output pulse of the pulse generating circuit is also recorded in the voice track of the VTR 30 as shown in FIG. 5f.

The measurement of the longitudinal profile of the road surface will be described as follows. As the laser beam is scanned to the point Pa along the line L shown in FIG. 1, the laser beam is projected upon the road surface through the optical fibers 251 and 261 and distance detectors 25 and 26. Accordingly, secondary light sources (spots) are formed at the points Pb and Pc on the road surface by the laser beams and these secondary light sources are focused on the respective two dimensional position sensors 252 and 262 of the detectors 25 and 26 as shown in FIG. 3. As is well known in the art, each position sensor outputs the position of the focal point as an electric signal As a consequence, when the points Pb and Pc at which the secondary light sources are formed vary in the vertical direction due to irregularity of the road surface, in other words, when the distances to the points Pb and Pc vary, distance signals corresponding to the variations are outputted from the position sensors 252 and 262.

Further, when the laser beam is scanned to point Pa, the television camera 22 picks up the picture image at the point Pa as shown in FIG. 3. For this reason, by suitably processing the picture image, the distance to the point Pa can be determined.

Figure 4:
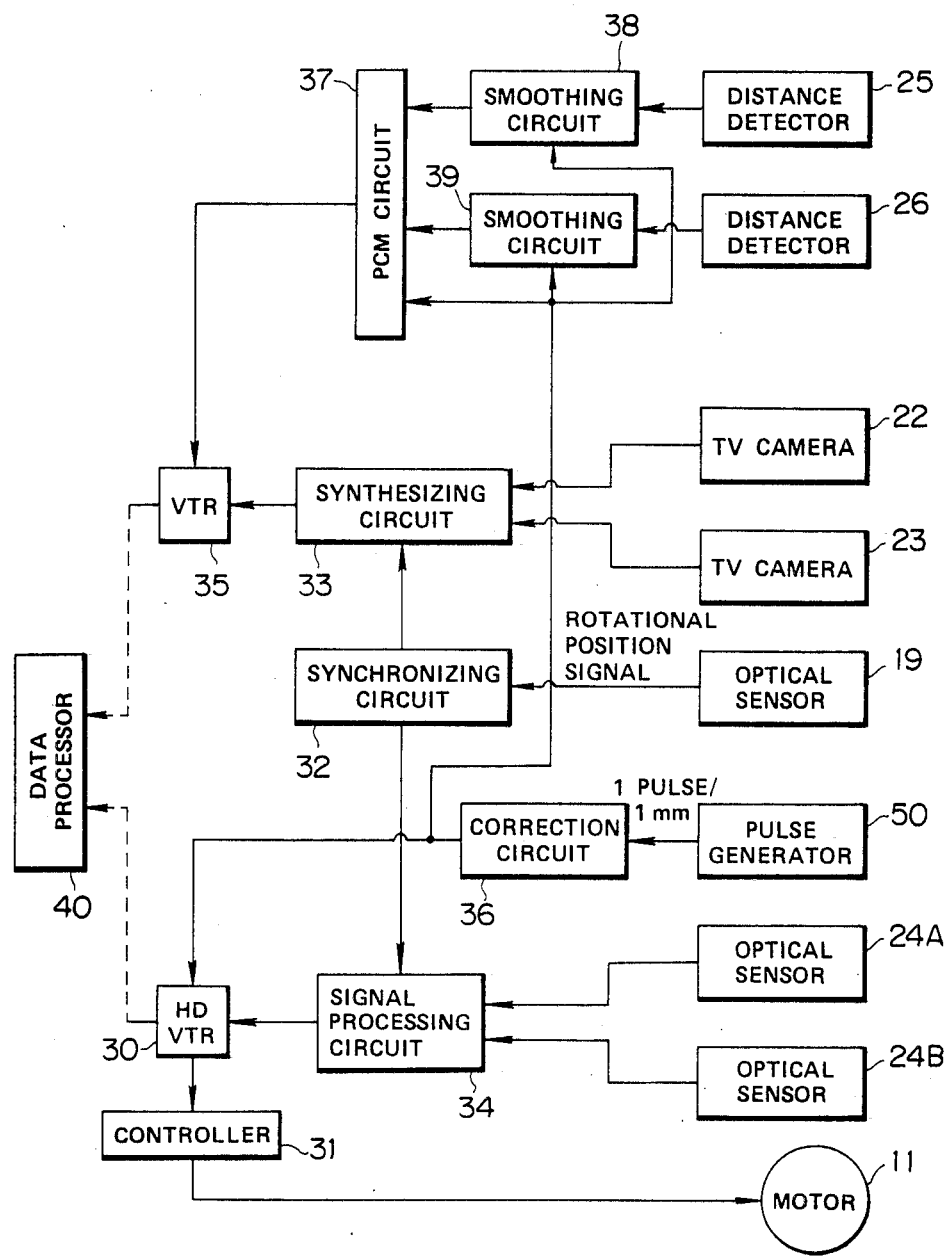
FIG. 4 is a block diagram showing the electric circuit of the measuring apparatus embodying the invention.

Smoothing circuits 38 and 39 shown in FIG. 4 function to average the distance signals outputted from the distance detectors 25 and 26 in accordance with a pulse generated by the pulse generator. The average signals are encoded by PCM circuit 37 and then recorded on the sound track of VTR 35 as distance data $D_B$ and $D_C$ as shown in FIG. 5d.

Figure 11:
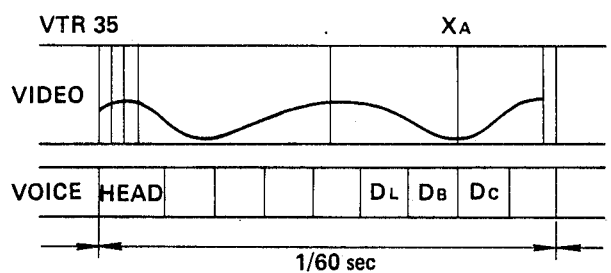
FIG. 11 shows the memory content of a VTR.

FIG. 11 illustrates a video track of the VTR 35 and the content of record of a sound track during one frame of television. The transverse profile is measured as follows from value $X_A$ shown in FIG. 11 (which represents the value of the picture image of the laser beam at point Pa, that is the distance to the road at point Pa) and the distance data $D_B$ and $D_C$.

Figure 12:
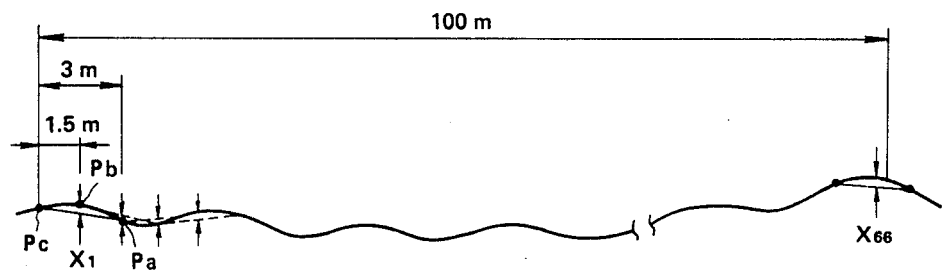
FIG. 12 is a graph showing a method of obtaining a longitudinal profile of the road surface.

More particularly, as shown in FIG. 12, a distance between a line segment interconnecting points Pa and Pc, and point Pb is determined, and then by calculating (estimated value of standard deviation) according to the following equation, the longitudinal profile can be obtained in the same manner as in a case utilizing so-called 3 m profile meter.

$$\sigma = \sqrt{\frac{1}{N-1}\left(\Sigma x^2 - \frac{(\Sigma x)^2}{N}\right) \times \frac{1}{C_2^*}}$$

where: measured value; N: number; $C_2^*$: a constant determined by N and N 30 is nearly equal to 1. Incidentally, data $D_L$ recorded on the VTR 35 are used as the running distance data when determining the longitudinal profile.

Although in this embodiment, the distance to the road at the point Pa is determined based on the picture image of the television camera, detectors similar to the distance detectors 25 and 26 can be used for determining the distance to the road.

Figure 13:
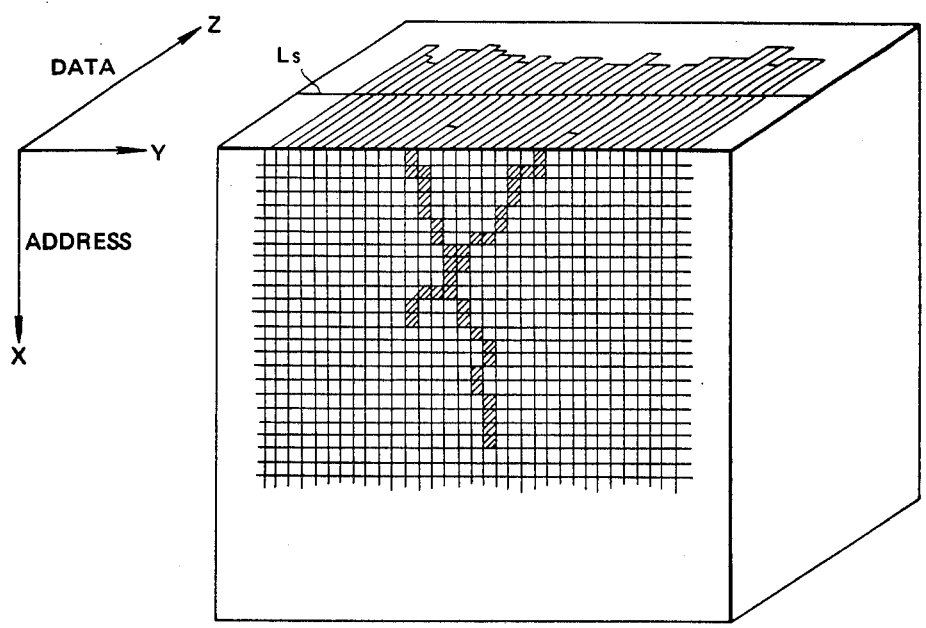
FIG. 13 is a graphical representation showing the manner of storing the data regarding cracks in a picture image memory device.

As above described, the data regarding the transverse profile, cracks and the longitudinal profile are recorded on the VTR 30 and 35. These records are transferred to data processor 40 in an off line mode, and the data are stored in respective exclusive picture image memory devices after being processed by the processor. For example, the crack data is stored in a picture image memory device as shown in FIG. 13 in which X direction corresponds to the longitudinal direction of the road, Y direction to transverse direction and Z direction to crack data represented by X and Y addresses. The X address represents the running distance of the car, while Y address the scanning position of the laser beam. The data stored in the memory devices is converted into binary values in the processor 40 in accordance with a threshold value Ls shown in FIG. 13 so that the position of the crack is judged in accordance with data less than the threshold value Lc. The result of judgment is displayed on display means, not shown such as a cathode ray tube.

What is claimed is:

1. A road surface condition detecting apparatus mounted on a vehicle comprising;
   laser beam scanning means for scanning a laser beam in a transverse direction of the road surface;
   image pick-up means for picking up locus of a scanning of said laser beam in an inclined direction for producing transverse profile data of the road surface;
   light receiving means for receiving a laser beam reflected from said road surface in an inclined direction for producing crack data of said road surface;
   road distance detecting means for measuring distances to said road surface from three positions on a line in the longitudinal direction of said vehicle for producing longitudinal profile data of said road surface;
   running distance detecting means for measuring a running distance of said vehicle; and
   recording means for recording data respectively produced by said image pick-up means, said light receiving means and said distance detecting means together with the running distance data produced by said running distance detecting means.

2. The apparatus according to claim 1 wherein said laser beam scanning means comprises a rotatable polygonal mirror and a laser beam projector for projecting the laser beam upon said polygonal mirror.

3. The apparatus according to claim 1 wherein said laser beam scanning means has a scanning speed of 2880 times per second.

4. The apparatus according to claim 1 wherein said image pick-up means comprises a first television camera picking up one half of the scanning locus of said laser beam, and a second television camera picking up the other half of said locus.

5. The apparatus according to claim 1 further comprising further light receiving means for receiving reflected light in the direction of projection of said laser beam among light of the laser beam reflected from said road surface, and means for comparing an output of said further light receiving means with an output of said first mentioned light receiving means.

6. The apparatus according to claim 1 wherein said light receiving means comprises a photomultiplier tube.

7. The apparatus according to claim 1 wherein the spacing between said three positions on said longitudinal axis of said vehicle is set to be 1.5 m.

8. The apparatus according to claim 1 wherein said road distance detecting means comprises two light sources for respectively projecting light to two points excluding a point on said locus on said road surface corresponding to two of said three positions of the vehicle and two position detecting means for detecting positions of light reflected from said two points, and said image pick-up means.

9. The apparatus according to claim 1 wherein said road distance detecting means comprises three light sources respectively projecting light to three points on said road surface corresponding to said three positions, and three position detecting means for detecting positions of light reflected from said points.

10. The apparatus according to claim 9 wherein said light sources comprise said laser beam scanning means and laser beam leading means for leading laser beam of a predetermined position from said laser beam scanning means onto said three points.

11. The apparatus according to claim 10 wherein said laser beam leading means comprises a partially transmissive mirror and three lines of optical fiber.

* * * * *